United States Patent
Yoo

(10) Patent No.: US 8,822,051 B2
(45) Date of Patent: Sep. 2, 2014

(54) PROTECTION CIRCUIT MODULE INCLUDING THERMISTOR AND SECONDARY BATTERY PACK HAVING THE SAME

(75) Inventor: Martin Yoo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 202 days.

(21) Appl. No.: 13/171,357

(22) Filed: Jun. 28, 2011

(65) Prior Publication Data
US 2012/0121939 A1 May 17, 2012

Related U.S. Application Data

(60) Provisional application No. 61/413,351, filed on Nov. 12, 2010.

(51) Int. Cl.
| | | |
|---|---|---|
| *H01M 2/00* | (2006.01) | |
| *H01M 10/48* | (2006.01) | |
| *H01M 2/34* | (2006.01) | |
| *H01M 10/42* | (2006.01) | |
| *H01M 10/44* | (2006.01) | |
| *H01M 10/50* | (2006.01) | |
| *G01K 7/22* | (2006.01) | |
| *H01M 6/50* | (2006.01) | |
| *G01K 1/14* | (2006.01) | |

(52) U.S. Cl.
CPC ............ *H01M 10/486* (2013.01); *H01M 2/348* (2013.01); *H01M 10/425* (2013.01); *H01M 10/443* (2013.01); *H01M 2200/10* (2013.01); *H01M 10/5026* (2013.01); *G01K 7/22* (2013.01); *H01M 2/34* (2013.01); *H01M 10/5004* (2013.01); *H01M 10/488* (2013.01); *H01M 10/50* (2013.01); *H01M 6/5044* (2013.01); *H01M 6/50* (2013.01); *G01K 1/14* (2013.01); *Y02E 60/12* (2013.01)
USPC ................. 429/61; 429/62; 429/90; 429/112; 429/121

(58) Field of Classification Search
CPC ............ G01K 1/14; G01K 7/22; H01M 2/34; H01M 2/348; H01M 10/425; H01M 10/443; H01M 10/5004; H01M 10/488; H01M 10/50; H01M 6/5044; H01M 6/50; H01M 10/42; H01M 10/486; H01M 10/5026; Y02E 60/12
USPC ............... 429/61–62, 90, 112, 120–124, 133, 429/140, 163–164
See application file for complete search history.

(56) References Cited

U.S. PATENT DOCUMENTS

| | | | |
|---|---|---|---|
| 4,346,285 A | * | 8/1982 | Nakamura et al. ............ 219/540 |
| 5,585,710 A | | 12/1996 | Nakamura et al. |

(Continued)

FOREIGN PATENT DOCUMENTS

| | | |
|---|---|---|
| CN | 1380713 A | 11/2002 |
| CN | 1941489 A | 4/2007 |

(Continued)

OTHER PUBLICATIONS

Chinese Office Action dated Jan. 30, 2014 for Chinese Patent Application No. CN 201110259322.4 which claims priority from U.S. Appl. No. 61/413,351, filed Nov. 12, 2010, and captioned U.S. Appl. No. 13/171,357, and cites the above-identified reference Nos. 1, 4, 5 & 6.

(Continued)

*Primary Examiner* — Patrick Ryan
*Assistant Examiner* — Ben Lewis
(74) *Attorney, Agent, or Firm* — Knobbe Martens Olson & Bear LLP

(57) ABSTRACT

A secondary battery comprises a bare cell and a protection circuit module comprising a printed circuit board and a thermistor. The thermistor comprises: a supporting member comprising an elastic material; a temperature sensor formed on the supporting member; a terminal configured to couple to a printed circuit board; and a conductive portion formed on the supporting member, wherein the conductive portion is connected to the terminal and to the temperature sensor.

20 Claims, 7 Drawing Sheets

(56) References Cited

U.S. PATENT DOCUMENTS

| | | | |
|---|---|---|---|
| 2002/0101326 A1* | 8/2002 | Lavenuta | 338/22 R |
| 2002/0150815 A1 | 10/2002 | Ehara | |
| 2007/0020509 A1 | 1/2007 | Kim | |
| 2009/0316752 A1* | 12/2009 | Kawase et al. | 374/183 |
| 2010/0136392 A1 | 6/2010 | Pulliam et al. | |

FOREIGN PATENT DOCUMENTS

| | | | | |
|---|---|---|---|---|
| CN | 101583858 A | 11/2009 | | |
| GB | 2281810 | 3/1995 | | |
| JP | 03-208301 | * 9/1991 | | H01C 7/02 |
| JP | 1994-007569 | 2/1994 | | |
| JP | 1994-142350 | 5/1994 | | |
| JP | 2006-035942 | 2/2006 | | |

OTHER PUBLICATIONS

Extended European Search Report for corresponding EP Application No. 11173398.6, Feb. 1, 2012.

* cited by examiner

PROTECTION CIRCUIT MODULE INCLUDING THERMISTOR AND SECONDARY BATTERY PACK HAVING THE SAME

RELATED APPLICATIONS

This application claims the benefit of U.S. Provisional Patent Application No. 61/413,351 filed with the United States Patent and Trademark Office on Nov. 12, 2010, the entire contents of which are incorporated herein by reference.

BACKGROUND

1. Field

The present technology relates to protection circuit modules that include a thermistor and a secondary battery pack having the same, and more particularly, to a secondary battery pack and a protection circuit module in which a thermistor is fixed.

2. Description of the Related Technology

A thermistor is a protection element used for secondary battery packs and a type of resistor whose unique resistance varies with temperature. Thermistors can be classified into a negative temperature coefficient (NTC) thermistor formed of a NTC material, which has a resistance that decreases with increasing temperature, and a positive temperature coefficient thermistor (PTC) formed of a PTC material, which has a resistance that increases with increasing temperature. The PTC material has a relatively low resistance at normal temperatures, allowing current to flow smoothly. However, when the PTC material increases in temperature due to increases in the ambient temperature or an overcurrent, resistance can increase about 1000 to 10000 times or more compared to the initial resistance, to block flowing current. Thus, the PTC material is widely used to protect various electronic components from overheating or overcurrents.

SUMMARY

An aspect of the present invention is to provide a protection circuit module including a means to fix a thermistor in a secondary battery pack without additional components or processes, and a secondary battery pack including the protection circuit module.

Further, an aspect of the present invention is to provide a protection circuit module including a means to prevent a thermistor from abnormally being detached even though a fabricated secondary battery pack has an impact while being transferred or used, and a secondary battery pack.

According to an aspect of the present invention, a protection circuit module includes a printed circuit board having a protection circuit, and a thermistor connected to the protection circuit of the protection circuit module.

According to an aspect, the thermistor includes a supporting member comprising an elastic material; a temperature sensor formed on the supporting member; a terminal configured to couple to a printed circuit board; and a conductive portion formed on the supporting member, wherein the conductive portion is connected to the terminal and to the temperature sensor.

According to an aspect, the conductive portion of the thermistor comprises a conductive film. The conductive portion may comprise a conductive wire printed on an insulating film. The conductive portion may be formed over substantially every surface of the supporting member. The conductive portion may be formed over every surface except the lateral sides of the supporting member. The conductive portion may be formed over a portion of the supporting member.

According to an aspect, the supporting member has a cross section that is rectangular, pentagonal or hexagonal. The supporting member may have a portion that has a curved shape.

According to an aspect, the temperature sensor is formed on a surface of the supporting member that is curved.

According to an aspect, the thermistor comprises a second temperature sensor and a second terminal, wherein the second temperature sensor is electrically connected to the second terminal.

According to an aspect, the thermistor comprises a hole that extends through the supporting member.

Further, an aspect of the present invention also provides a secondary battery pack comprising a bare cell, and a protection circuit module comprising a printed circuit board and a thermistor, wherein the thermistor comprises a supporting member comprising an elastic material, a temperature sensor formed on the supporting member, a terminal coupled to the printed circuit board, and a conductive portion formed on the supporting member, wherein the conductive portion is connected to the terminal and to the temperature sensor.

According to an aspect, the printed circuit board comprises a hole through which the terminal of the thermistor is inserted.

According to an aspect, the printed circuit board comprises a recess in a region adjacent to the hole, and wherein the recess is configured to accommodate the thermistor.

According to an aspect, the terminal comprises a portion extended through the hole and bent along a surface of the printed circuit board.

According to an aspect, the bent portion of terminal is soldered to the printed circuit board.

According to an aspect, the temperature sensor contacts an external surface of the bare cell.

According to an aspect, the secondary battery comprises a plurality of bare cells.

According to an aspect, the thermistor contacts more than one bare cell.

BRIEF DESCRIPTION OF THE DRAWINGS

The accompanying drawings, together with the specification, illustrate certain embodiments of the present invention, and, together with the description, serve to explain the principles of the present invention.

DETAILED DESCRIPTION

Figure 1A:
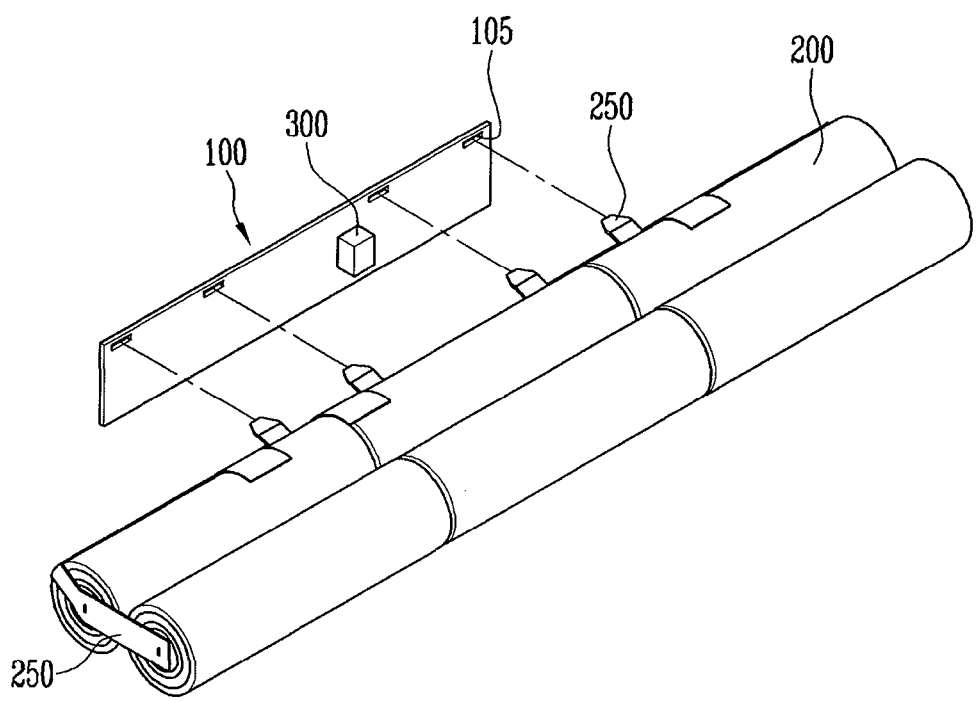
FIG. 1A is an exploded perspective view illustrating a battery pack according to an embodiment.

Hereinafter, certain embodiments of the present invention will be described with reference to the accompanying drawings. In the specification, terms to indicate directions "up," "down," "right," and "left" are based on directions in the drawings unless the context clearly indicates otherwise. Further, like reference numerals refer to like elements in the embodiments.

First Embodiment

Figure 1B:
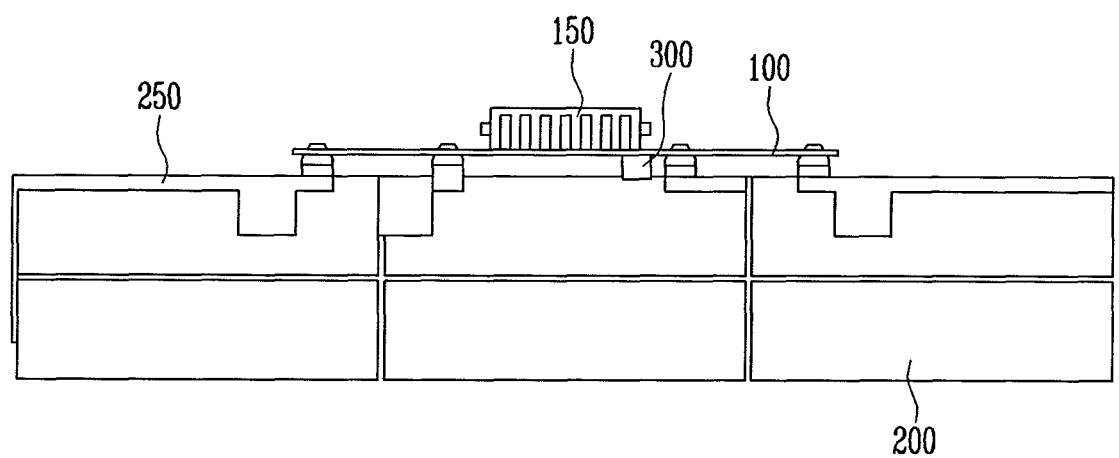
FIG. 1B is a plan view illustrating the battery pack of FIG. 1A.
Figure 2:
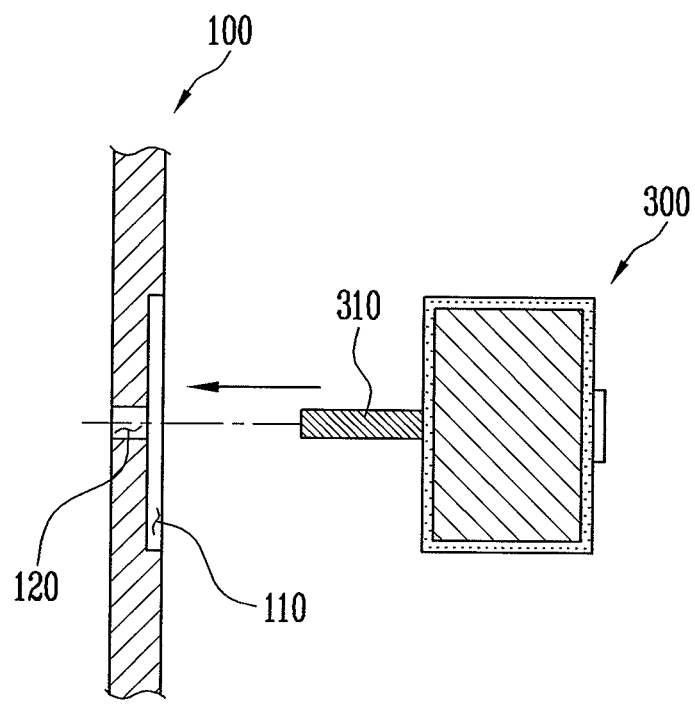
FIG. 2 is a cross-sectional view illustrating that a thermistor is combined with a circuit board according to an embodiment.

FIG. 1A is an exploded perspective view illustrating a battery pack according to an embodiment of the present invention, FIG. 1B is a plan view illustrating the battery pack of FIG. 1A, and FIG. 2 is a cross-sectional view illustrating that a thermistor is combined with a circuit board according to an embodiment of the present invention.

As shown in FIGS. 1A and 1B, a secondary battery pack according to the present embodiment includes a protection circuit module 100 including a thermistor 300 and at least one bare cell 200 electrically connected to the protection circuit module 100. The thermistor 300 may include a temperature sensor, which will be described, and closely contacts an external surface of the bare cell 200 between the protection circuit module 100 and the bare cell 200.

First, the protection circuit module 100 of an embodiment may be formed of a module and a protection circuit seated on a printed circuit board, the module performing charging and discharging and performing communication with an outside, and the protection circuit securing stability while charging and discharging are performed. The protection circuit module 100 may include a terminal 105 connected to each bare cell 200. Each bare cell 200 may be electrically connected to the terminal formed in the protection circuit module 100 through a member functioning as an electrical conducting wire, such as a nickel tab 250. Further, as shown in FIG. 1B, a connector 150 may be formed on the outside of the protection circuit module 100 to be connected to an external device.

Terminal accommodation holes 120 may be formed in pairs of cathodes and anodes in the protection circuit module 100, a terminal of the thermistor 300 being accommodated in the terminal accommodation holes 120. Here, a seating part 110 may be formed in the protection circuit module 100 to improve fixing of the thermistor 300 to the protection circuit module 100. The seating part 110 may be formed with a stepped part in a similar shape to a contact surface with the thermistor 300.

As shown in FIG. 2, a pair of terminals 310 of the thermistor 300 is inserted into the terminal accommodation holes 120 formed in the protection circuit module 100 and fixed by welding or soldering. Here, as described above, in order to prevent the thermistor 300 from being shaken or being easily detached, the seating part 110 recessed in a region adjacent to the terminal accommodation holes 120 may be formed to seat the thermistor 300. Thus, due to the recessed seating part 100, the thermistor 300 may be securely mounted in the printed circuit board of the protection circuit module 100. The seating part 110 may be formed in a groove stepped and recessed in a region of the protection circuit module 100, particularly the printed circuit board of the protection circuit module 100, to accommodate the thermistor 300.

Then, the protection circuit module 100 combined with the thermistor 300 can be connected to the bare cell 200. One side of the nickel tab 250 connecting terminals of bare cells 200 in parallel or in series may be connected to a corresponding protection circuit module through soldering or welding. Here, as shown in FIG. 1B, the thermistor 300 may be disposed between the protection circuit module 100 and the bare cell 200 and closely attached to the external surface of the bare cell 200 to be pressed. The thermistor 300 may be pressed by the bare cell 200, being fixed to the protection circuit module 100 when the battery pack is formed, and thus the thermistor 300 can have a stable structure that is not easily detached.

Figure 6:
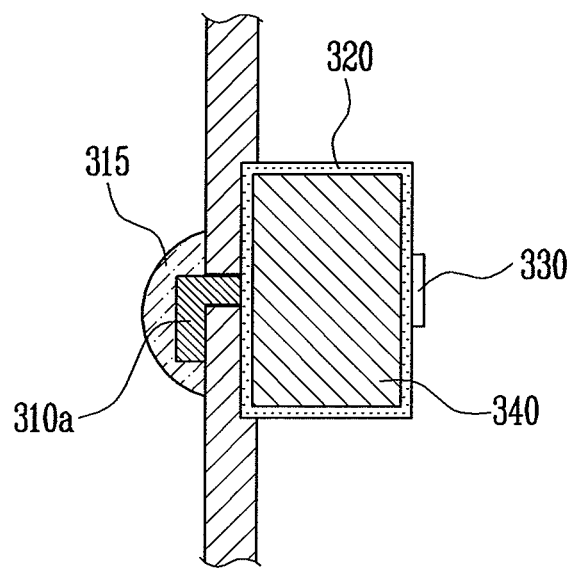
FIG. 6 is a cross-sectional view illustrating a thermistor is combined with a circuit board according to an embodiment.

Here, in order to improve fixing of the thermistor 300, as shown in FIG. 6, a pair of terminals 310a may be bent at an end portion and connected through welding or soldering. Here, due to the bent end portion of the terminals 310a, the thermistor 300 is not easily detached even though solder comes off.

Figure 3A:
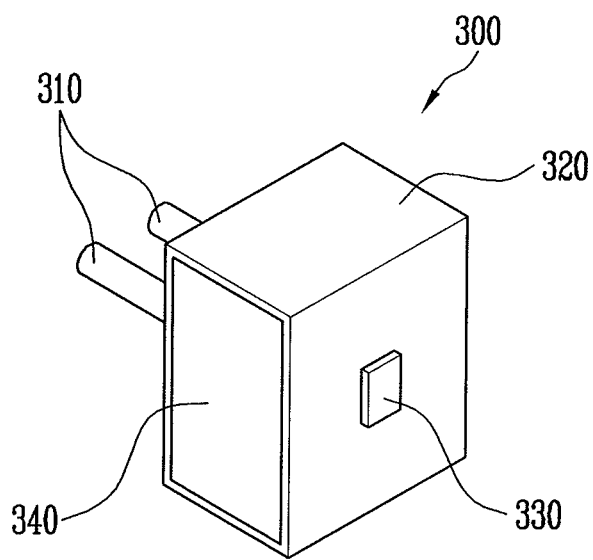
FIG. 3A is a perspective view illustrating a thermistor according to an embodiment.
Figure 3B:
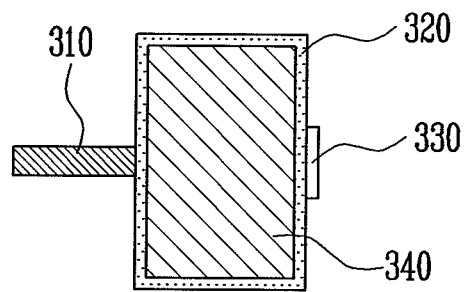
FIG. 3B is a lateral view of the thermistor of FIG. 3A.
Figure 3C:
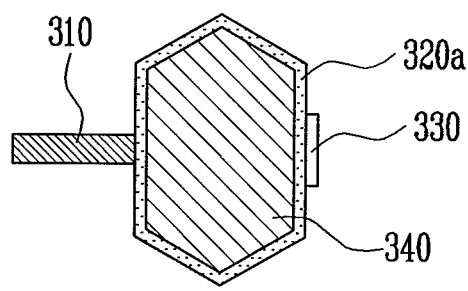
FIG. 3C is a lateral view of a thermistor according to another embodiment.
Figure 3D:
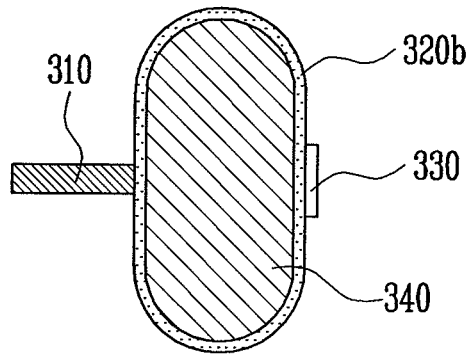
FIG. 3D is a lateral view of a thermistor according to still another embodiment.
Figure 3E:
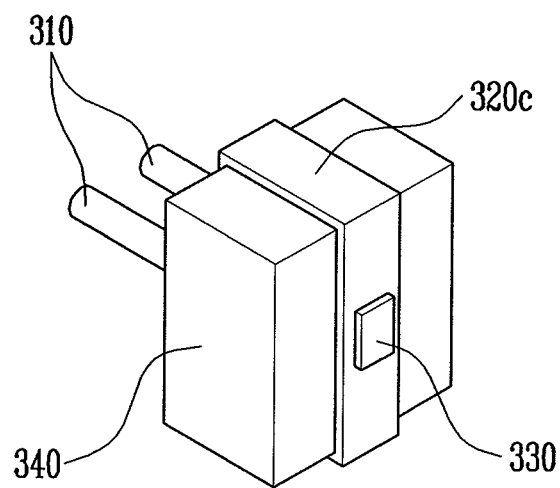
FIG. 3E is a perspective view of a thermistor according to still another embodiment.

FIG. 3A is a perspective view illustrating a thermistor according to an embodiment of the present invention, and FIG. 3B is a lateral view of the thermistor of FIG. 3A. FIGS. 3C to 3E are lateral views and a perspective view of various thermistors according to embodiments of the present invention.

As shown in FIGS. 3A and 3B, the thermistor 300 includes a supporting body 340, a conductive connection part 320, a temperature sensor 330, and a pair of terminals 310. In the present embodiment, the thermistor 300 collectively refers to a means for measuring temperature using the temperature sensor 330. The thermistor 300 is a device whose resistance varies with ambient temperature and may use a positive temperature coefficient (PTC) thermistor and a negative temperature coefficient (NTC) thermistor.

The supporting body 340 may be formed of an elastic material that is contractable by an external force. The supporting body 340 of the elastic material can enable the thermistor 300 to be more attached to the bare cell 200 elastically. The supporting body 340 of the present embodiment has a cuboid shape. However, as shown in FIG. 3C, the supporting body 340 may have a hexagonal longitudinal section, and a conductive connection part 320a may be formed on an external surface of the hexagonal supporting body 340. Further, as shown in FIG. 3D, the supporting body 340 may have a round longitudinal section without an edge, and a conductive connection part 320b may be formed on an external surface of the round supporting body 340. The supporting body 340 may have various shapes.

The conductive connection part 320 is an element that can electrically connect the temperature sensor 330 with the pair of terminals 310. The conductive connection part 320 is formed to enclose the external surface of the supporting body 340 of the elastic material. Here, the conductive connection part 320 may use a film-type conductive member or an insulating film on which a conducting wire is printed. The conductive connection part 320 can also function to fix the supporting body 340. Thus, as shown in FIG. 3A, the conductive connection part 320 may be formed to enclose four sides of the supporting body 340 while the remaining opposite two sides are exposed. Further, when the conductive connection part 320 has a hexagonal longitudinal section or a round longitudinal section, as shown in FIGS. 3C and 3D, the conductive connection part 320 can enclose the external surface of the supporting body 340. As shown in FIG. 3E, a conductive connection part 320c may be formed on a portion of the external surface of the supporting body 340 to have a minimum area just for connection of the temperature sensor 330 with the pair of terminals 310.

The conductive connection part 320 of the thermistor 300 is referred to as 320a, 320b, 320c, and 320d depending on the shapes but is collectively referred to as 320 hereinafter.

The temperature sensor 330 may be formed on an external surface of the conductive connection part 320. The temperature sensor 330 may be closely attached to and in contact with the external surface of the bare cell 200. The temperature sensor 330 can convert information based on ambient temperature into electrical characteristics, and can transmit the electrical characteristics to the protection circuit module 100. That is, the temperature sensor 330 may be formed on the conductive connection part 320 so that the temperature sensor 330 is electrically connected to the protection circuit module 100 through the conductive connection part 320 and the pair of terminals 310.

In detail, the temperature sensor 330 measures the temperature of the bare cell 200 and may be connected to the protection circuit of the protection circuit module 100 through the conductive connection part 320, 320a, 320b, 320c, and 320d and the pair of terminals 310.

The pair of terminals 310, the conductive connection part 320, and the temperature sensor 330 may be formed a film structures. For example, if an integrated film-type thermistor is used, the respective components may not need separate manufacturing, thereby facilitating fabrication and reducing manufacturing costs.

Second Embodiment

Figure 4A:
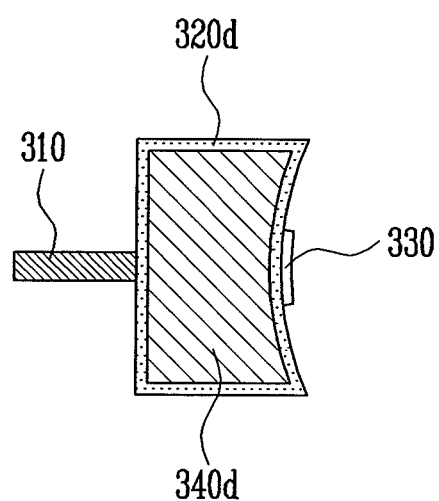
FIG. 4A is a lateral view of a thermistor having a curved side.
Figure 4B:
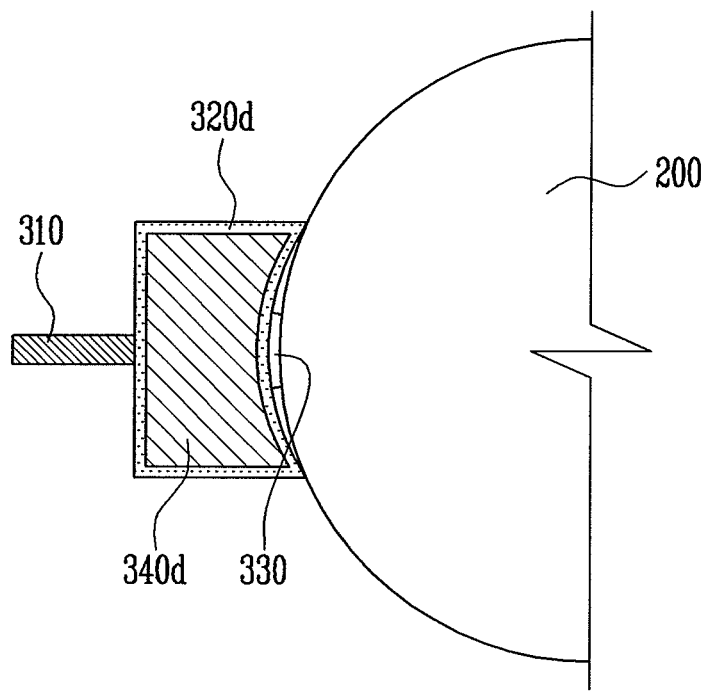
FIG. 4B is a lateral view illustrating the thermistor of FIG. 4A is in contact with a bare cell.

FIG. 4A is a lateral view of a thermistor having a curved or round side according to another embodiment of the present invention, and FIG. 4B is a lateral view illustrating that the thermistor of FIG. 4A is in contact with a bare cell.

As shown in FIGS. 4A and 4B, the thermistor 300 of the present embodiment may include a supporting body 340d having one side curved or round. A conductive connection part 320d may be formed on an external surface of the supporting body 340d. A temperature sensor 330 may be attached to a round external surface of the conductive connection part 320d or the supporting body 340d.

The external surface of the supporting body 340d or the conductive connection part 320d in contact with the bare cell may be formed to have a round shape so that the thermistor 300 is closely in contact with the cylindrical bare cell. Further, due to the round shape of the supporting body 340d, the thermistor 300 of the present embodiment may have its structure improved in attachment and stability when the bare cell 200 is cylindrical. FIG. 4B shows that the temperature sensor 330 attached to one round side of the conductive connection part 320b or the supporting body 340d is attached and fixed to the bare cell 200.

Third Embodiment

Figure 5:
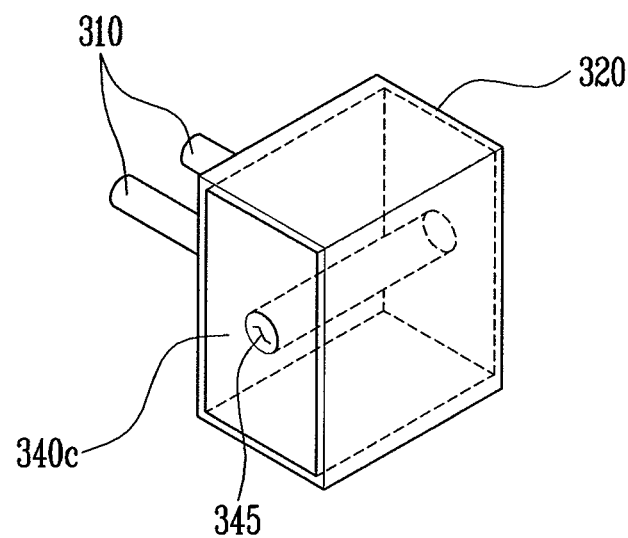
FIG. 5 is a perspective view of a thermistor formed with a penetration hole.

FIG. 5 is a perspective view of a thermistor formed with a porous hole according to still another embodiment of the present invention. In the present embodiment, a supporting body 340c may be formed of an elastic material and have a porous shape. Although the supporting body 340c of the elastic material can include one porous hole 345 in FIG. 5, a plurality of porous holes 345 may be formed. When the supporting body 340c has the porous hole 345 therein, a thermistor 300 may be improved in elasticity. That is, the supporting body 340c may be improved in contraction and expansion. The porous hole 340c may be formed parallel with a pivot of the bare cell 200 with which the thermistor 300 is closely in contact, or be formed perpendicularly to a direction in which the supporting body 340c contracts. The porous hole 340c may have a longitudinal section which is not limited in shape.

Fourth Embodiment

Figure 7:
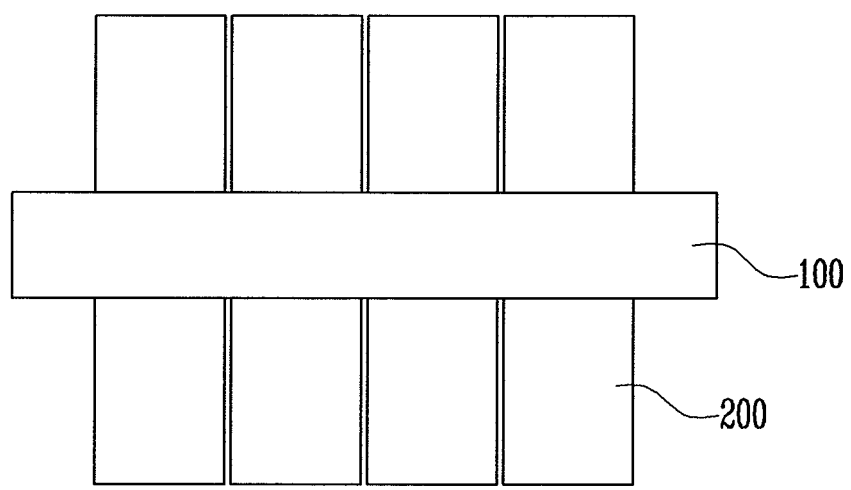
FIG. 7 is a schematic plan view illustrating a battery pack according to another embodiment.
Figure 8:
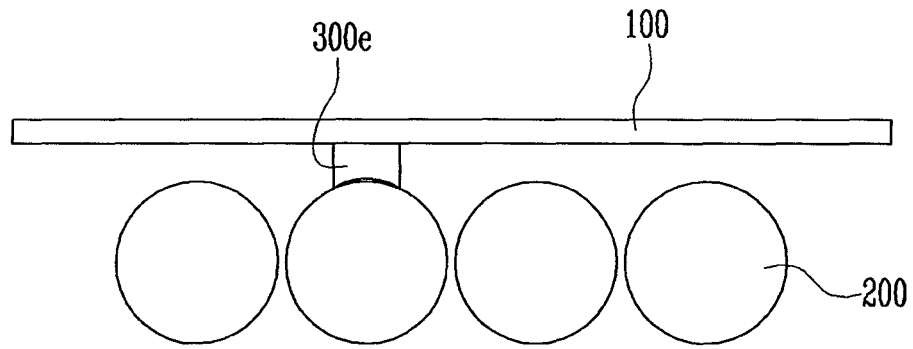
FIG. 8 is a schematic front view illustrating a position of a thermistor according to an embodiment.

FIG. 7 is a schematic plan view illustrating a battery pack according to still another embodiment of the present invention, and FIG. 8 is a schematic front view illustrating a position of a thermistor.

In the present embodiment, as shown in FIGS. 7 and 8, a protection circuit module 100 is disposed perpendicular to a plurality of bare cells 200. Here, when the thermistor 300e is in contact with only one of the bare cells 200, as shown in FIG. 8, the present embodiment is similar to the first embodiment. Thus, a structure and a method of connecting the thermistor 300e and the protection circuit module 100 may be the same as described above.

Fifth Embodiment

Figure 9:
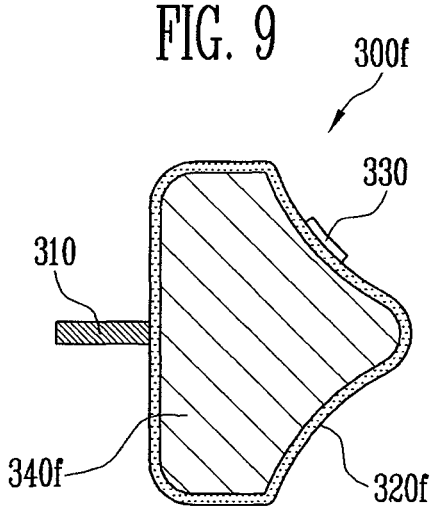
FIG. 9 is a lateral view of a thermistor according to another embodiment.
Figure 10:
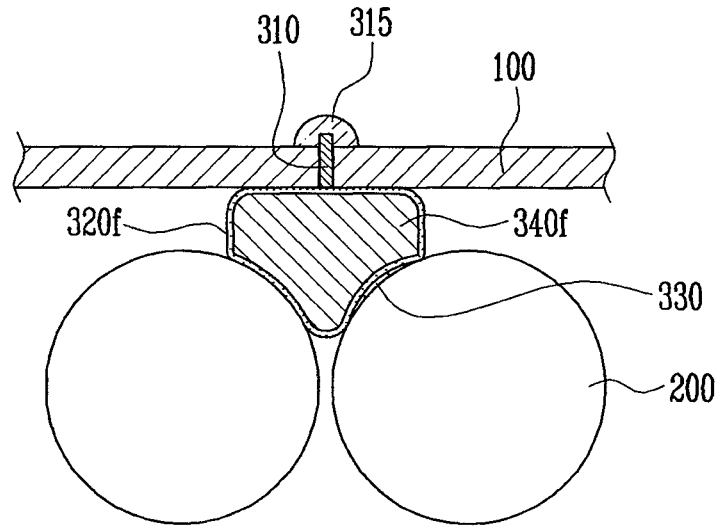
FIG. 10 is a front view illustrating that the thermistor of FIG. 9 is used.

FIG. 9 is a lateral view of a thermistor according to still another embodiment of the present invention, and FIG. 10 is a front view illustrating that the thermistor of FIG. 9 is used.

In the present embodiment, as shown in FIGS. 9 and 10, a protection circuit module 100 is disposed over a bare cell 200, and the thermistor 300e is simultaneously in contact with two cylindrical bare cells. Here, the thermistor 300e may include a supporting body 340f being formed of an elastic material and having a shape to fill a spatial shape or a space between the two neighbouring bare cells 200, as shown in FIG. 10. Here, the supporting body 340f may have a cross section having the shape of a space formed between the supporting body 340f and the two bare cells 200 so that the thermistor 300e closely contacts the two neighboring bare cells 200. In FIGS. 9 and 10, the supporting body 340f has a roughly pentagonal shape. Further, in order to improve attachment or adhesion, the thermistor 300f may be formed to have a round surface which contacts the bare cells 200. When the thermistor 300f is attached to the protection circuit module 100, and then the protection circuit module 100 is connected with the bare cells 200, two surfaces of the thermistor 300f closely contact the neighboring bare cells 200 simultaneously to form a stable structure, as shown in FIG. 10. Although the present embodiment illustrates the thermistor 300f closely contacts the two bare cells 200, the thermistor 300f may closely contact more than two bare cells. The thermistor 300f may include at least one temperature sensor 330 formed between the supporting body 340f and the bare cells 200. Here, when two or more temperature sensors 330 are provided, the same number of pairs of terminals 310 as the temperature sensors 330 may be provided so that the terminals 310 are connected to the temperature sensors 330. For example, when two temperature sensors 330 are provided, two pairs of terminals 310 connected to the respective temperature sensors 330 may be provided. Alternatively, when one or more temperature sensors 330 are provided, the one or more temperature sensors 330 may be connected to a pair of terminals 310 in parallel or in series to measure temperature.

As described above, according to embodiments of the present invention, a thermistor may be stably fixed in a secondary battery pack without an additional fixing component, such as a fixing tape.

Further, embodiments of the present invention may eliminate a process in which the thermistor is fixed in the secondary battery pack using the fixing tape or the like.

Sixth Embodiment

The present embodiment relates a conductive connection part 320g according to an embodiment.

As described above, the conductive connection part 320g is an element to electrically connect a temperature sensor 330 and a pair of terminals 310. The conductive connection part 320g of the present embodiment may be formed to pass through a supporting body 340g. Further, the conductive connection part 320g has the elasticity to bend in a predetermined direction when the supporting body 340g contracts by an external force.

While the present invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A thermistor comprising:
    a supporting member formed of a material and having a plurality of surfaces;
    a temperature sensor formed on the supporting member that is separate from the supporting member and is positioned on a first surface of the supporting member;
    a terminal configured to couple to a printed circuit board that is formed on a second surface of the supporting member; and
    a conductive portion formed on the first, second and a third surface of the supporting member, wherein the conductive portion is connected to the terminal and to the temperature sensor.

2. The thermistor of claim 1, wherein the conductive portion comprises a conductive film.

3. The thermistor of claim 1, wherein the conductive portion comprises a conductive wire printed on an insulating film.

4. The thermistor of claim 3, wherein the conductive portion is formed over substantially every surface of the supporting member.

5. The thermistor of claim 3, wherein the conductive portion is formed over every surface except the lateral sides of the supporting member.

6. The thermistor of claim 1, wherein the conductive portion is formed over a portion of the supporting member.

7. The thermistor of claim 1, wherein the supporting member has a cross section that is rectangular, pentagonal or hexagonal.

8. The thermistor of claim 1, wherein the supporting member has a portion that has a curved shape.

9. The thermistor of claim 8, wherein the temperature sensor is formed on a surface of the portion of the supporting member that has the curved shape.

10. The thermistor of claim 1, further comprising a second temperature sensor and a second terminal, wherein the second temperature sensor is electrically connected to the second terminal.

11. A secondary battery comprising:
    a bare cell; and
    a protection circuit module comprising a printed circuit board and a thermistor, wherein the thermistor comprises
    a supporting member comprising a material and having a plurality of surfaces;
    a temperature sensor formed on a first surface of the supporting member that is separate from the supporting member,
    a terminal coupled to the printed circuit board that is formed on a second surface of the supporting member, and
    a conductive portion formed on the first, the second and a third surface of the supporting member,
    wherein the conductive portion is connected to the terminal and to the temperature sensor.

12. The secondary battery of claim 11, wherein the printed circuit board comprises a hole through which the terminal of the thermistor is inserted.

13. The secondary battery of claim 12, wherein the printed circuit board comprises a recess in a region adjacent to the hole, and wherein the recess is configured to accommodate the thermistor.

14. The secondary battery of claim 12, wherein the terminal comprises a portion extended through the hole and bent along a surface of the printed circuit board.

15. The secondary battery of claim 14, wherein the bent portion of terminal is soldered to the printed circuit board.

16. The secondary battery of claim 11, wherein the temperature sensor contacts an external surface of the bare cell.

17. The secondary battery of claim 11, wherein the secondary battery comprises a plurality of bare cells.

18. The secondary battery of claim 17, wherein the thermistor contacts more than one bare cell.

19. The secondary battery of claim 17, wherein the one or more porous holes are formed parallel with a pivot of the bare cell with which the thermistor is in contact.

20. The secondary battery of claim 17, wherein the one or more porous holes are formed perpendicularly to a direction in which the supporting member is configured to contract.

* * * * *